(12) United States Patent
Lause

(10) Patent No.: US 10,184,775 B2
(45) Date of Patent: Jan. 22, 2019

(54) STANDARD TOOL DIAMETER GAGE

(71) Applicant: Shawn Lause, City of Leslie, MO (US)

(72) Inventor: Shawn Lause, City of Leslie, MO (US)

( * ) Notice: Subject to any disclaimer, the term of this patent is extended or adjusted under 35 U.S.C. 154(b) by 22 days.

(21) Appl. No.: 15/133,411

(22) Filed: Apr. 20, 2016

(65) Prior Publication Data

US 2017/0307348 A1    Oct. 26, 2017

(51) Int. Cl.
*G01B 5/08* (2006.01)
*B23Q 17/09* (2006.01)
*B23Q 17/24* (2006.01)

(52) U.S. Cl.
CPC ........... *G01B 5/08* (2013.01); *B23Q 17/0919* (2013.01); *B23Q 17/2466* (2013.01)

(58) Field of Classification Search
CPC .................................. G01B 5/08; B23Q 17/22
See application file for complete search history.

(56) References Cited

U.S. PATENT DOCUMENTS

| | | | | |
|---|---|---|---|---|
| 4,591,989 A * | 5/1986 | Tanaka | ............. | G05B 19/40938 700/176 |
| 4,663,998 A * | 5/1987 | Parsons | ................... | B25B 23/12 81/125 |
| 4,837,941 A * | 6/1989 | Mullins | ............... | B23Q 17/2266 33/626 |
| 5,030,920 A * | 7/1991 | Nakamura | ......... | G05B 19/4065 324/451 |
| 5,880,847 A * | 3/1999 | Wakaoka | ........... | G01B 11/2408 356/613 |
| 5,943,923 A * | 8/1999 | Shih | ...................... | B25B 23/108 81/125 |
| 2017/0045357 A1 * | 2/2017 | Lummes | ............... | G01B 21/042 |

FOREIGN PATENT DOCUMENTS

| | | | | |
|---|---|---|---|---|
| DE | 4432317 A1 | * | 3/1996 | ......... B23Q 17/0938 |
| JP | 01306152 A | * | 12/1989 | |
| JP | 02298459 A | * | 12/1990 | |
| JP | 2016117131 A | * | 6/2016 | |

* cited by examiner

*Primary Examiner* — Charlie Y Peng

(57) ABSTRACT

A device and method used in a spindle or fixture to measure tool sizes. The device has two conical shapes that have precision machined surfaces. The device's face has a precise size which is the same nominal size as that of a material removing tool. The device's shaft allows for concentric and precision fastening of the device to a spindle or a fixture. The nose of the device is located on the end of the larger of the two conical shapes which is visible exposed when mounted and used. The end of the device is at the end of the smaller of the two conical shapes which is hidden after mounting. The combination of using the device and method will allow more accurate programming of machine tools which in turn will provide higher quality results on machined work pieces and reduced machining cycles.

4 Claims, 5 Drawing Sheets

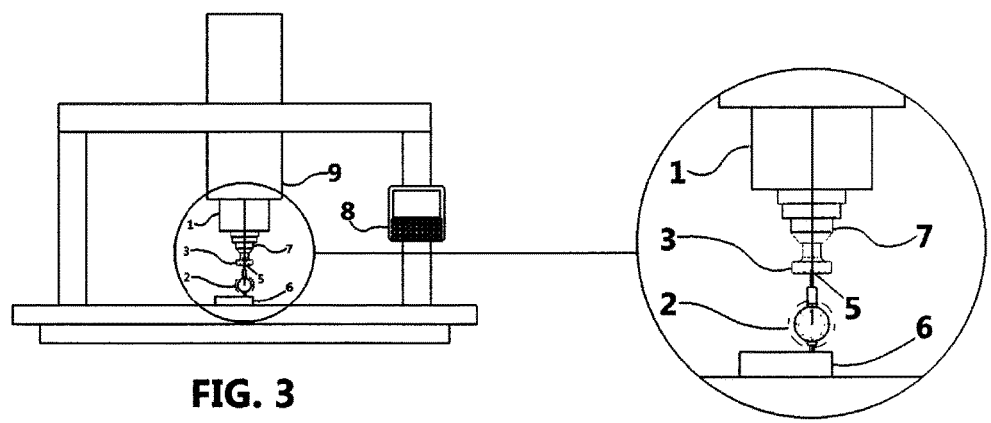
FIG. 3
FIG. 3a
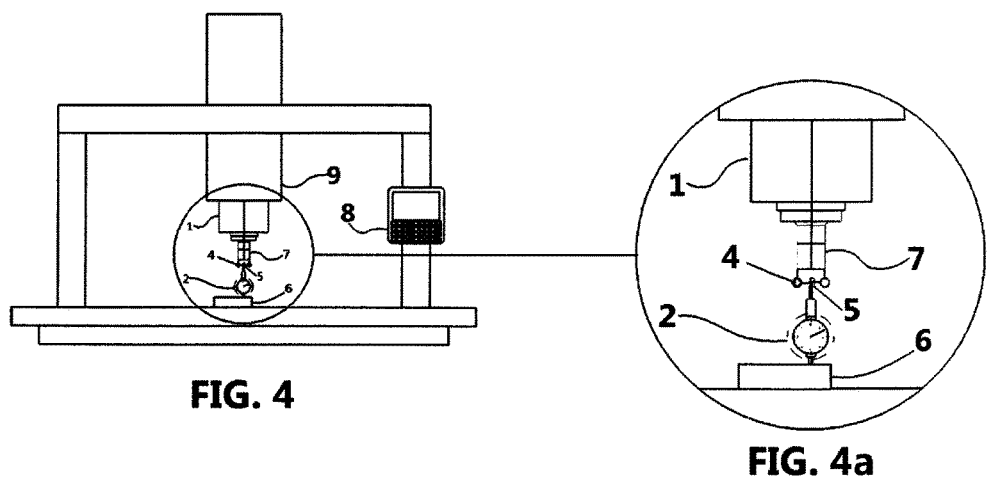
FIG. 4
FIG. 4a

STANDARD TOOL DIAMETER GAGE

FIELD OF THE INVENTION

The present invention relates to a method used to precisely measure a cutting tool.

BACKGROUND OF THE INVENTION

Cutting tools used in CNC machines are made to nominal sizes but rarely measure the precise size they were designed to.

The precision machining of components serving many industries becomes more and more demanding. Computerized Numerical Control, or CNC, Machine Tools are becoming more advanced, software programming is becoming more powerful, and new cutting tools grow in user acceptance based on their particular strategy. Throughout all of these continuing improvements with technology, the one variable that is often overlooked is that a nominal size tool does not always measure its designed precise size.

Precise work pieces can be manufactured with the use of CNC machines. These machines are very accurate and precise. A CNC machine tool has three linear axes of motion while more advanced CNC machine tools are four axis, five axis, or more. CNC machine tools have become very advanced and repeat toolpath positions well within 0.0002" (two ten-thousandths of an inch).

Machine tool programming software plays a vital role in achieving efficient tool paths in CNC machines. To achieve efficient tool paths accurate tool paths must be programmed at the machine or through offline CAM (Computer-Aided Manufacturing) software. CNC programs, or tool paths, are primarily based off of the size of tool specified. Tool paths have accuracy to or finer than 0.0002" (two ten-thousandths of an inch).

Tooling used in machining centers has rapidly grown in size and shape. Specific tool geometry meets certain criteria to achieve specific tool path strategies. These tools are more commonly made from high speed steel, cobalt, and carbide. Tools can be made from one solid material, or component. Tools may also have two or more materials, or components, commonly known as indexable tools. Tools are designed to standard nominal sizes in both imperial and metric units.

With the investment of a CNC machine, CAM software, and dedicated tooling, machinists expect high quality results to precisely machine components. However this is not always the result.

More often than not a tool does not measure the exact nominal size of its design. Software continues to apply paths correctly within 0.0002", the machine tool continues to repeat a toolpath within 0.0002", but the cutting tool is more commonly the variable and the reason behind low quality results.

Tools are not easy to measure with hand instruments. Tools have very fine cutting edges, sometimes an odd number of flutes, or sometimes variable flute geometry . . . just to name a few. Tools very rarely measure their nominal size within 0.0002" (two ten-thousandths of an inch).

Some CNC machines offer an electronic means to measure a tool however they will not always identify the condition of a tool with multiple flutes.

SUMMARY OF THE INVENTION

The invention provides a method to accurately measure a cutting tool with the use of a custom gage so the precise size can be utilized when programming a machine tool. Both embodiments of the invention have precision manufactured diameters that measure within 0.0002" (two ten-thousandths of an inch). The diameters of both embodiments are manufactured concentric to their corresponding shaft and pocket. The shaft and the pocket of both embodiments allow the precision diameters to be accurately located in a tool holder. The distance from the face on the diameters to the dead center of the apertures is the common set point. The nose side on the end of the gage is the visible side when mounted in a tool holder.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is that it brings attention to an issue that is often overlooked and assumed when machining components: nominal sized cutting tools do not measure their precise diameter.

Another object of the present invention is to provide a method to accurately measure a cutting tool with the use of the custom gage so the precise size can be utilized when programming a machine tool. The knowledge of the exact size of a cutting tool reduces multiple cycle runs, improves accuracy of the finish product, and can even prevent scrap workpieces.

With the ability to individually pinpoint each of the different cutting edges on a cutting tool the present invention offers a more visible way to evaluate the integrity of a tool.

Cutting tools are exposed to low and high levels of force leading to changes in their geometry. The present invention provides a standard way of gaging a tool over its lifespan.

Another object of the present invention is to provide a way for users to accurately measure their cutting tool.

Another object of the present invention is to provide a method and device that can be used by any user with minimal skill levels.

Another object of the present invention is to provide an accurate way of setting adjustable tools mounted in a spindle.

With the ability to determine cutting tool sizes outside a machining center the present invention provides an efficient way to measure using a fixture. Machining center time is more valuable than fixture time due to their manufacturing capabilities.

BRIEF DESCRIPTION OF DRAWINGS

FIG. 3 is a front view of a machine spindle 1 with the invention 3 installed showing the invention (gage) setting with an indicator 2, and FIG. 3a is a detail view.

FIG. 4 is a front view of a machine spindle 1 with a cutting tool 4 installed showing the tool measurement off of the known indicator setting, and FIG. 4a is a detail view.

The same reference numerals refer to the same parts throughout the various figures.

DETAILED DESCRIPTION OF THE INVENTION

The foregoing features, object, and advantages of the invention will become apparent to those skilled in the trade from the following detailed description of the preferred embodiment, especially when considered in conjunction with the accompanying drawings.

The present invention, the Standard Tool Diameter Gage, offers the ability to accurately measure a cutting tool in or outside a machine tool.

With its precise size and capability to be easily mounted into a machine spindle or fixture the present invention serves as an excellent method to measure tool sizes.

Figure 1A:
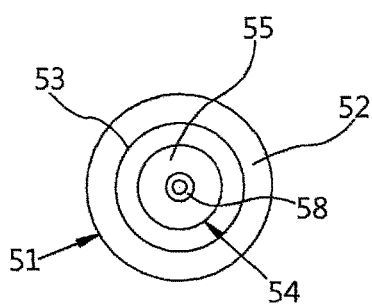
FIG. 1A is a top view of the invention shown in FIG. 1. All geometry and features are concentric.
Figure 2A:
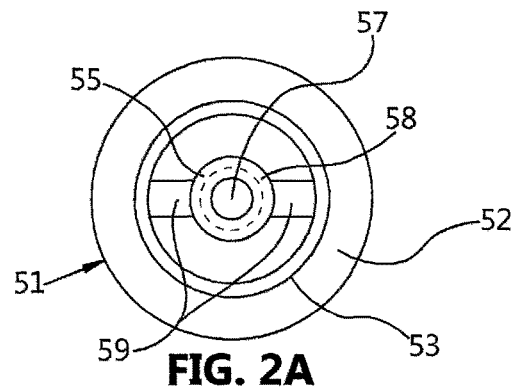
FIG. 2A is a top view of the alternate embodiment. A horizontal slot 59 is shown located on the end 55.
Figure 1:
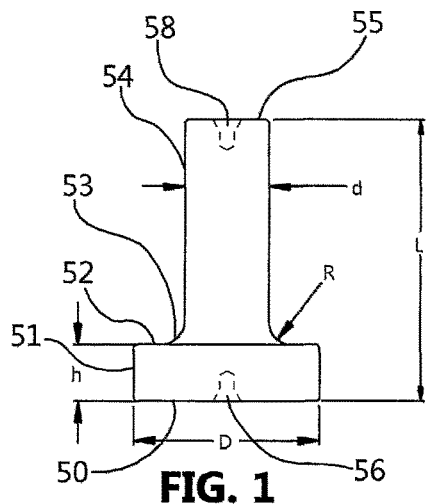
FIG. 1 is a front view of the invention with a shank 54 for mounting. The aperture 56 and aperture 58 are shown in the center of the nose 50 and the end 55.
Figure 2:
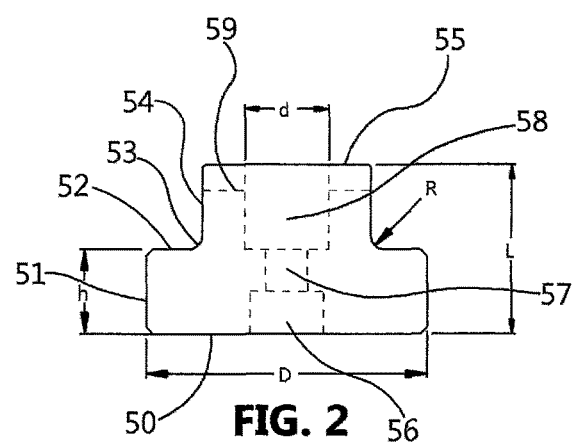
FIG. 2 is a front view of the alternate embodiment of the invention with a pocket 58 for mounting. The aperture 56 and aperture 58 are shown in the center of the nose 50 and the end 55.

FIG. 1 and FIG. 2 show the operating dimensional characteristics of the present invention. "D" represents the main measuring diameter. "d" represents the shank or arbor size. "h" represents the land area of the measuring diameter. The measuring diameter can be a minimum size of 0.005 inches and a maximum size of 24.000 inches. "R" represents the corner where a radius may be conveniently present for aid in manufacturing. "L" is the overall length of the gage. FIG. 1 shows a front view of a round cylindrical shaped head.

FIG. 1 shows a front view of the present invention. The first diameter as at D is the gage size of the device that is manufactured to precise nominal values. The second diameter as at d is the shank of the device used for mounting into a tool holder. The present invention, or gage has a nose 50 with a face 51 that abuts a block later shown. The nose 50 of the gage is perpendicular to the face 51. The face 51 and the shaft 54 are concentric to each other. The concentricity deviation between the face 51 and the shaft 54 must be held to a minimum to prevent inaccuracies. Measuring within tenths of an inch (0.0001) any inaccuracies between the face 51 and the shaft 54 will compound error when determining the actual tool size as later mentioned. The concentricity tolerance between the face 51 and the shaft 54 needs to be less than one ten thousandths of an inch (0.0001). A shoulder 52 is perpendicular to the face 51 and is tangent to a neck 53. The neck 53 has a small radius which serves as a transition between the shoulder 52 and a shaft 54. The shaft 54 is dimensionally longer than the face 51 for clamping and has an end 55 which is parallel to the nose 50. The shaft 54 is conical in shape and has parallel sides. The shaft 54 mounts and clamps inside a tool holder. A first aperture 56 is located in the dead center of the device on the nose 50. A second aperture 58 is located in the dead center of the device on the end 55. The end 55 is smaller in size in comparison to the face 50. The first aperture 56 and the second aperture 58 are blind apertures that are drilled in the centerline of the device. The first aperture 56 and the second aperture 58 are shallow in depth and that have sixty degree inclusive bevels at their entries. The first aperture 56 and the second aperture 58 serve as centers for aid in manufacturing.

FIG. 1A shows a top view of the device shown in FIG. 1. The end 55 is in the center of the shaft 54 and retains the second aperture 58. The shaft 54 is beneath and perpendicular to the end 55 and follows down to the neck 53. The neck 53 is adjacent to the shaft 54 which is adjacent to the shoulder 52. The face 51 of the invention hangs beneath the shoulder 52. The center of the end 55 is the second aperture 58. The face 51 and the shaft 54 should be machined together preferably in the same manufacturing setup so that the face 51 is parallel and true to the centerline of the shaft 54.

Figure 1B:
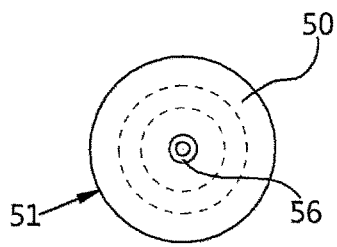
FIG. 1B is a bottom view opposite of that of FIG. 1A. All geometry and features are concentric.

FIG. 1B shows a bottom view of the device shown in FIG. 1. The nose 50 is the complete surface shown outside the first aperture 56. The nose 50 is the working end of the device. The face 51 of the device is perpendicular to the nose 50, that is into the plane of this figure. This face 51 surface must be machined to a high tolerance with a smooth surface finish therefore to be used to establish a known indicator setting. The face 51 should be manufactured within one ten thousandths of an inch (0.0001) and should have a surface finish of 32 RMS, root mean square of profile height deviation from the mean line, or better.

FIG. 2 shows a front view of the alternative embodiment of the invention. This device has less height than the device in FIG. 1 and suits larger diameter gages. The second aperture 58 is a pocket that accepts an adapter on a tool holder. The nose 50 of the gage is perpendicular to the face 51. The face 51 and the shaft 54 are concentric to each other. The shoulder 52 is perpendicular to the face 51 and is tangent to the neck 53. The neck 53 is a small radius which serves as a transition between the shoulder 52 and the shaft 54. The end 55 is parallel to the nose 50. The first aperture 56 is located in the center of the nose 50. The first aperture 56 is a clearance hole for a fastener used to mount the device to an arbor type tool holder. The second aperture 58 is a precise size that locates the device. The second aperture 58 must be machined concentric to the face 51 to eliminate inaccuracies. The throat 57 is clearance for a fastener. The throat 57 communicates to the first aperture 56 and the second aperture 58.

FIG. 2A shows a top view of the alternate embodiment shown in FIG. 2. The end 55 is at the end of the shaft 54. The shaft 54 is perpendicular to the end 55 and follows down to the neck 53. The neck 53 connects to the shaft 54 then to the shoulder 52. The face 51 of the device connects to the shoulder 52. When manufacturing the devices the face 51 needs to be machined perpendicular to the nose 50.

Figure 2B:
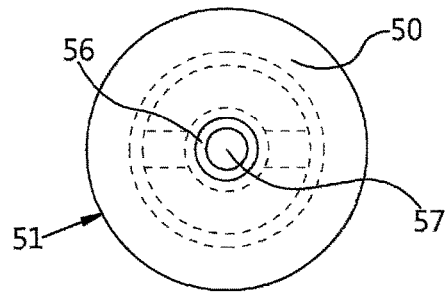
FIG. 2B is a bottom view opposite of FIG. 2A. The face 51, aperture 56, and aperture 57 are concentric.

FIG. 2B shows a bottom view of the alternate embodiment shown in FIG. 2. The throat 57 is in the center of the device. The first aperture 56 travels around the throat 57. The nose 50, appears as the surface shown outside of the first aperture 56. The face 51 of the device is perpendicular to the nose 50. The nose 50 is the working end of the device. The face 51 is manufactured with a high tolerance and is used to transfer a measurement. The distance from the center of the device to the face 51 is a known radial value. The face 51 should be manufactured within one ten thousandths of an inch (0.0001) and should have a surface finish of 32 RMS, root mean square of profile height deviation from the mean line, or better.

FIG. 3 and FIG. 4 are front views that show a method used to obtain the precise size of a cutting tool used in a machining center. The CNC machine 9 has linear axes that allow the spindle 1 to be traversed.

FIG. 3 shows a present invention 3 installed in a tool holder 7 located in a machine spindle 1. A CNC machine 9 with linear axes is shown with a spindle 1. An indicator 2 is shown set to a known position on the present invention 3. A contact point 5 of the indicator to the gage 3 has a setting at the highest peak of the gage 2 diameter (D) as also shown in FIG. 3a. The CNC machine 9 has a controller 8 for operating a program and manually joggling the spindle 1. The indicator block 6 is shown with an indicator 2. An indicator block 6 allows the indicator 2 to be securely mounted beneath the spindle 1.

FIG. 4 shows a cutting tool 4 installed in a tool holder 7 located in a machine spindle 1. An indicator 2 measures the deviation from the original setting in FIG. 3. The contact point 5 of the indicator to a cutting tool 4 is measured at the highest peak of the cutting edge as also shown in FIG. 4a. This measurement shown on the indicator 2 determines the precise size of the cutting tool 4.

Figure 5:
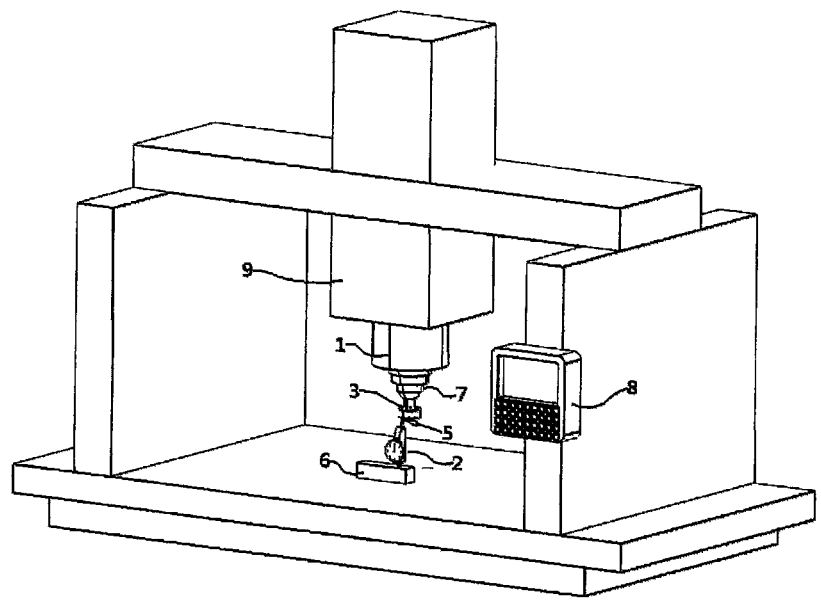
FIG. 5 is an isometric view showing a machine spindle 1 with the invention 3 installed.

FIG. 5 is an isometric view of FIG. 3. A CNC machine 9 with linear axes is shown with a spindle 1. A CNC machine 9 has a controller 8 for operating a program as well as joggling the spindle 1. This view shows the relation between the indicator setting and the present invention 3. FIG. 5 shows how a machine spindle 1 having a gage 3 should be positioned closely to a indicator 2 to make the preferred setting.

Figure 6:
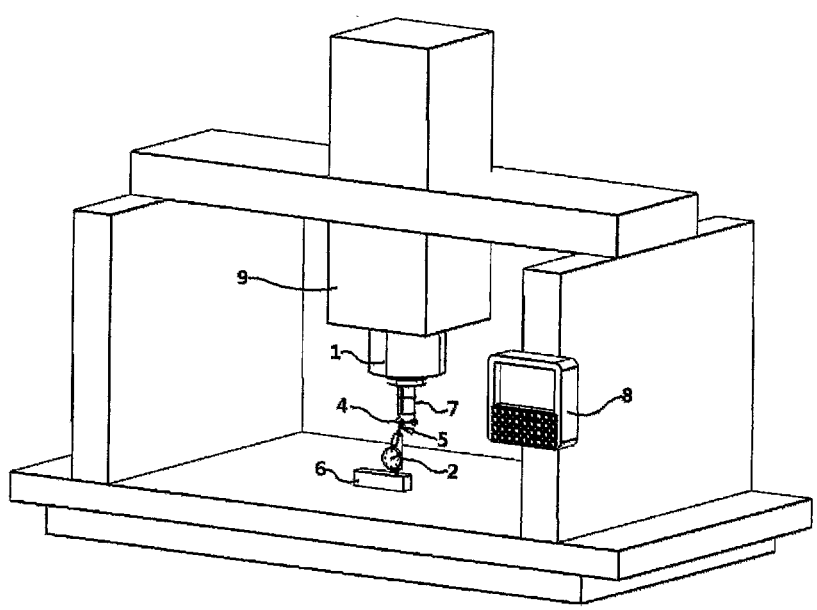
FIG. 6 is an isometric view showing a machine spindle 1 with a cutting tool 4 installed.

FIG. 6 is an isometric view of FIG. 4. This view shows the relation between the indicator 2 setting and the cutting tool 4 being measured. FIG. 6 is the same as FIG. 5 but with a difference of a cutting tool 4 installed in the spindle 1. FIG. 6 shows the deviation of the indicator setting made in FIG. 5 from that of the highest peak of the cutting edge on the cutting tool 4. The value on the indicator 2 is the measurement from which the nominal diameter size is calculated. A positive indicator value determines the cutting tool 4 is oversize from the nominal size. A negative indicator value determines the cutting tool 4 is undersize from the nominal size.

The process shown in FIGS. 7-10 is referred as an offline process because the time used to determine the actual cutting tool size is done outside a machining center.

Figure 7:
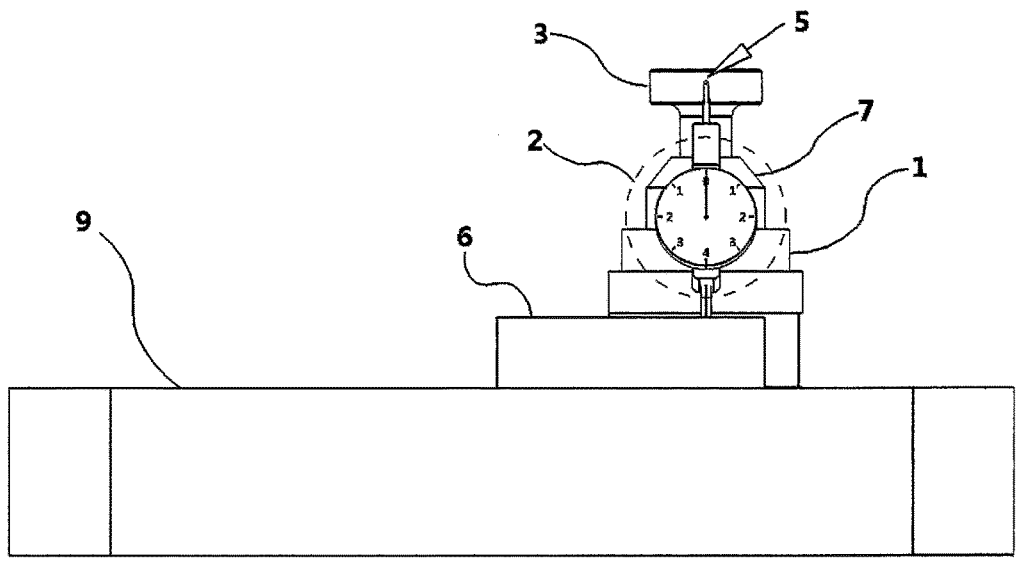
FIG. 7 is a front view of a fixture 9 outside of a machining center with the invention 3 installed showing the invention, or gage, setting with an indicator 2.
Figure 8:
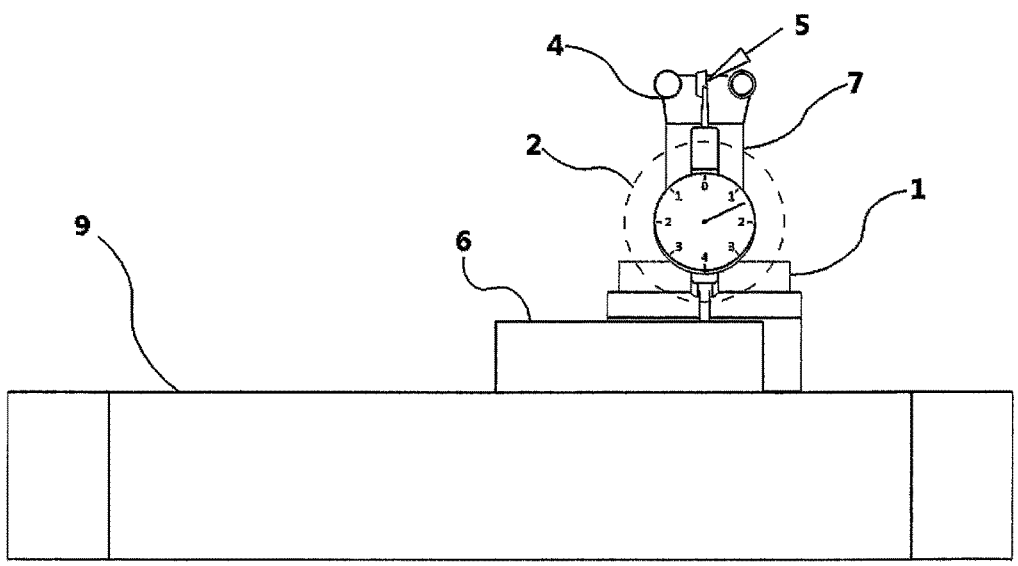
FIG. 8 is another front view of a fixture 9 outside of a machining center with a cutting tool 4 installed showing the tool measurement from a known indicator setting.

FIG. 7 and FIG. 8 are front views of the method used to obtain the precise size of a cutting tool 4 used in a fixture 9 outside of a machining center.

FIG. 7 shows a present invention 3 located in a fixture 9 with a spindle 1. An indicator 2 is shown being set to a known position on the invention 3. A fixture 9 retains a spindle 1 that accepts a tool holder 7. The indicator 2 with an indicator block 6 is mounted near the spindle 1. The contact point 5 of the indicator to the gage 3 is set at the highest peak of the gage 3 diameter. In FIG. 7 the indicator 2 is positioned and set at one stationary point to be used again in FIG. 8.

FIG. 8 shows a cutting tool 4 placed in a fixture 9 with a spindle 1. An indicator 2 measures the deviation from the original setting in FIG. 7. The contact point 5 of the indicator to the cutting tool 4 is measured at the highest peak of the cutting edge. This measurement shown on the indicator 2 determines the precise size of the cutting tool 4. This precise height from the spindle to the cutting edge contact point may need to be predetermined prior to setting the invention 3 in FIG. 7. The indicator block 6 with indicator 2 is positioned near the spindle for measuring. The cutting tool 4 assembled in a tool holder 7 is shown taking a measurement off of the indicator 2.

Figure 9:
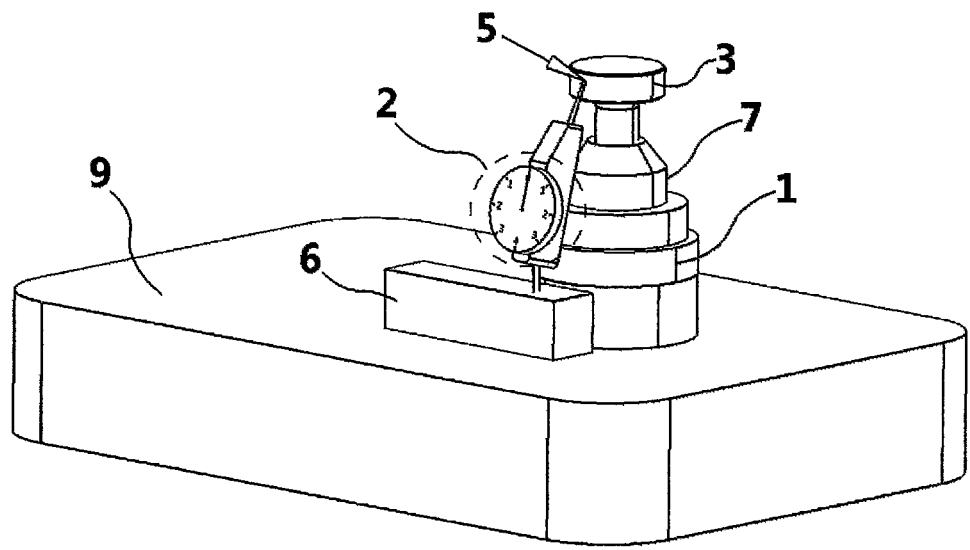
FIG. 9 is an isometric view showing a fixture 9 with the invention 3 installed.

FIG. 9 is an isometric view of FIG. 7. This view shows the relation between the indicator 2 setting and the invention 3. FIG. 9 shows how a spindle 1 in a fixture 9 with the gage 3 should be positioned closely to a indicator to make the preferred setting. Some cutting tools have small surface areas of contact. Without having a CNC machine with a controller to adjust the contact height of the cutting tool contact point 5, as also later shown in FIG. 10, the cutting tool height may need to be predetermined so the indicator 2 is not moved. The indicator block 6 and indicator 2 must be kept in one stationary position for precise results.

Figure 10:
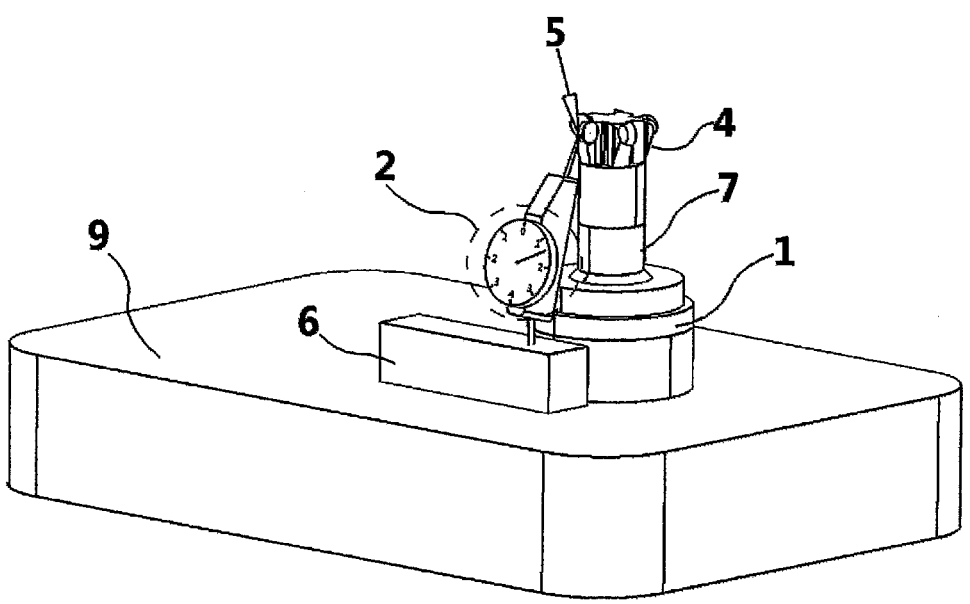
FIG. 10 is an isometric view showing a fixture 9 with a cutting tool 4 installed.

FIG. 10 is an isometric view of FIG. 8. This view shows the relation between the indicator 2 setting and the cutting tool 4 being measured. FIG. 10 shows the deviation of the indicator setting made in FIG. 9 from that of the highest peak of the cutting edge on the cutting tool 4. The value on the indicator 2 is the measurement from which the nominal diameter size is calculated from. A positive indicator value determines the cutting tool 4 is oversize from the nominal size. A negative indicator value determines the cutting tool 4 is undersize from the nominal size.

The standard tool diameter gage has a method for its use included with the invention. The method includes the following steps.

The process of measuring a cutting tool to obtain its exact precise size is a two step process which is illustrated in FIG. 3 and FIG. 4, and in FIG. 7 and FIG. 8. The two step process has been magnified into the following steps to highlight the critical details of the process.

First, Install the gage in a spindle. Once the preferred cutting tool 4 is selected for use it will determine the size of the standard tool diameter gage 3 to use. As shown in FIG. 3, a standard tool diameter gage 3 is installed in a tool holder 7 and is then mounted in a spindle 1.

Second, Set an indicator with the gage. The spindle 1 assembly is traversed to a test indicator 2 which preferable has a dial graduation of 0.0001. As shown in FIG. 3, the indicator stylus should be loaded to a common value shown on the dial. Setting this point with the indicator should be done on the highest peak of the standard tool diameter gage 3.

Third, Verify the contact point 5 has been achieved. Traverse the standard tool diameter gage back and forth across the indicator to ensure this highest point of contact has been reached. Furthermore manually rotate the spindle to ensure there is no run out as to this would offset the measurement. This new indicator set point will be used to test the cutting tool.

Fourth, Retract and remove the standard tool diameter gage 3 from the spindle 1. The indicator 2 and the indicator block 6 must be kept in a stationary position. It is important that the indicator 2 is not adjusted or bumped after this initial setting. The point of contact on the indicator 2 from the center of the spindle is now a known radial value.

Fifth, Install the cutting tool 4 in a spindle 1. As shown in FIG. 4, the selected cutting tool 4 installed in a tool holder 7 is mounted in a spindle 1. The cutting tool should be cleaned and clear of any debris from previous manufacturing use.

Sixth, Reference the cutting tool to the set indicator. It is important that the indicator 2 is not adjusted or bumped from the initial setting from the second step.

Seventh, Verify the indicator reading. By slowly rotating the spindle, find the highest peak 5 of the cutting edge on the cutting tool 4. Commonly rotate the cutting tool in the reverse rotation of its cutting use. This allows the indicator 2 to be loaded with little resistance by testing the relieved portion of the cutting edge first. This keeps the indicator 4 in a stationary position.

Eighth, Record the measurement. The measurement reading taken and shown in FIG. 4 can be a positive or negative value based off the initial setting in step 1. A positive reading will indicate the tool is oversize of that of the nominal tool size. A negative reading will indicate the tool is undersize of that of the nominal tool size.

And, Ninth, Calculate the discovery. The indicator reading on the test indicator is a radial value. The value (whether positive or negative) must be multiplied by 2 in order to add or subtract to the nominal diameter to determine the cutting tool's precise size.

FIG. 7 and FIG. 8 show the same method as described in FIG. 3 and FIG. 4 only using a fixture 6 outside of a machine tool.

I claim:

1. A method of aligning a machine cutting tool, said method comprising:
    selecting a preferred cutting tool and determining a size of a gage;
    mounting said gage in a machine tool spindle;
    traversing said gage to a test indicator;
    loading said indicator on a dial on a highest peak of a standard tool diameter gage;
    traversing said gage repeatedly across the indicator verifying reach of this highest point of contact;
    rotating the spindle to ensure an absence of run out;
    adjusting the indicator to a common value shown on the dial; and,
    retracting the machine spindle from the indicator.

2. The method of measuring a cutting tool of claim 1 further comprising:
    said loading said indicator including setting an indicator with a gage.

3. The method of measuring a cutting tool in claim 1 wherein said traversing the gage over an indicator includes transferring a measurement.

4. The method of measuring a cutting tool in claim 1 further comprising:
    positioning an indicator to a "set"; and, measuring the cutting tool from the "set" indicator reading.

* * * * *